Sept. 16, 1952   J. C. JOZWIK   2,610,633
CORN HUSKING ROLL
Filed Jan. 26, 1949   2 SHEETS—SHEET 1
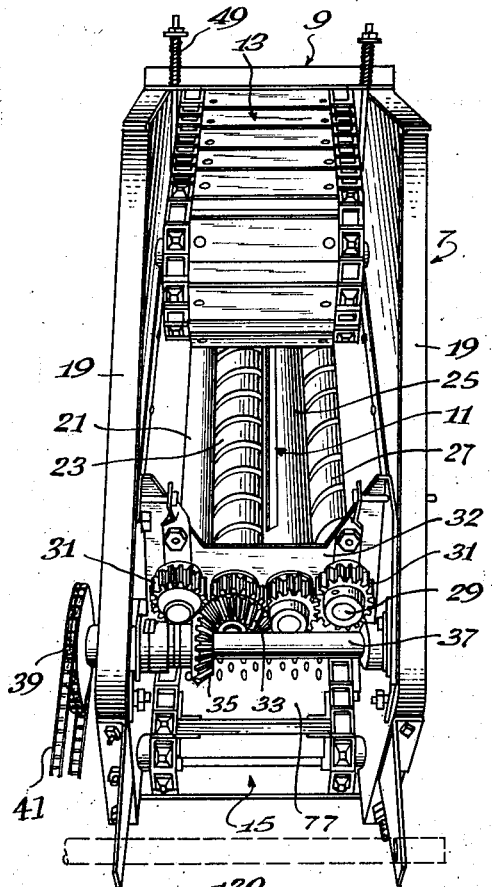
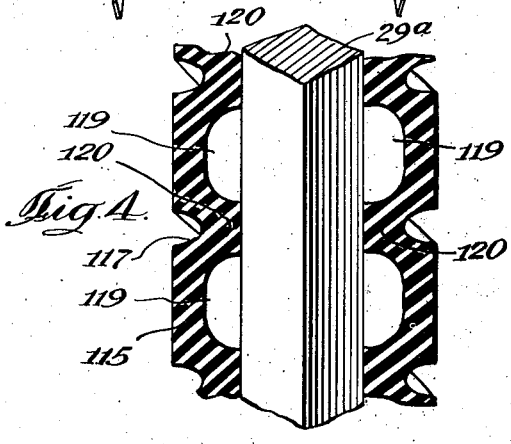
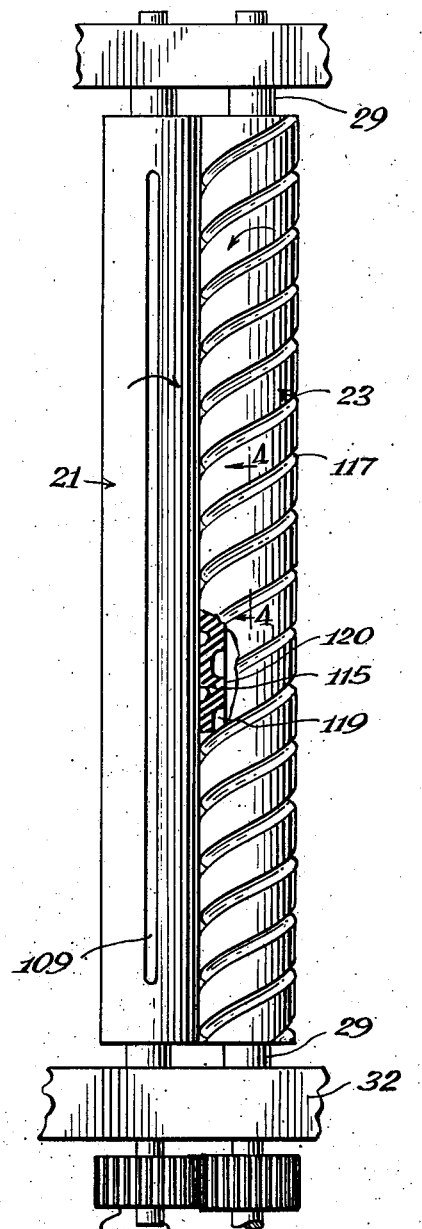
Inventor
John C. Jozwik
By Soans, Pond & Anderson
Attorneys Sept. 16, 1952 J. C. JOZWIK 2,610,633
CORN HUSKING ROLL
Filed Jan. 26, 1949 2 SHEETS—SHEET 2
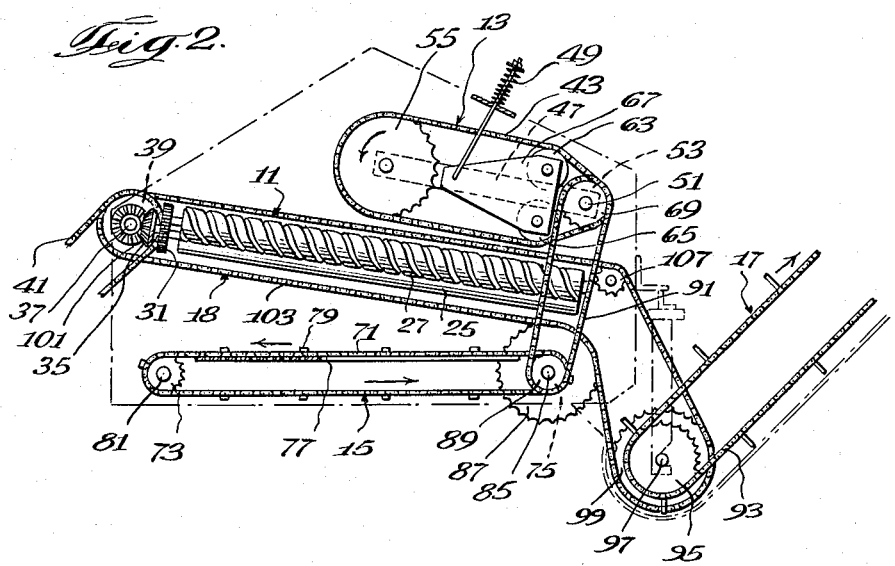
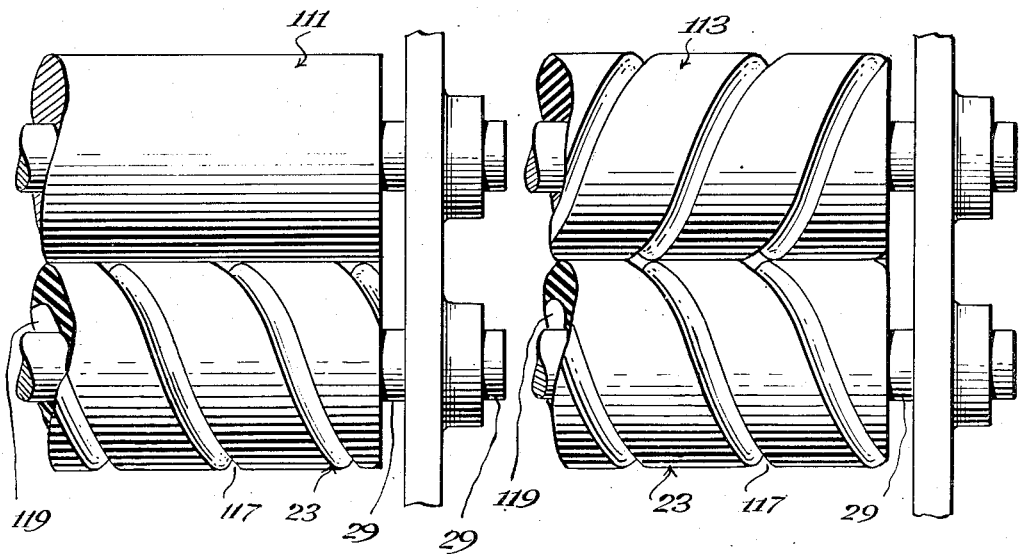
Inventor:
John C. Jozwik
By Soans, Pond & Anderson
Attorneys Patented Sept. 16, 1952

2,610,633

UNITED STATES PATENT OFFICE 2,610,633

CORN HUSKING ROLL

John C. Jozwik, State College, N. Mex., assignor to J. I. Case Company, Racine, Wis., a corporation of Wisconsin Application January 26, 1949, Serial No. 72,781

5 Claims. (Cl. 130—5)

The present invention relates generally to corn harvesting apparatus and has particular relation to husking rolls used in connection with such apparatus.

During the operation of conventional corn harvesting machines, picked ears of corn are deposited on a bed of rapidly rotating husking rolls which are arranged in cooperating pairs. Each roll of the respective pairs of rolls is adapted to rotate in a direction counter to the cooperating roll. The rolls are arranged in parallel relation in a manner such that the surfaces of adjacent rolls contact along a line to provide a nip between the respective rolls. The husks of the picked ears are engaged in these nips and the counter rotation of the cooperating rolls causes the husks to be stripped from the individual ears of corn. Concurrently with the stripping action, the ears are caused to move along the bed of rotating rolls to suitable disposal means. This means is provided rearwardly of the husking bed in most conventional harvesting apparatuses.

Many difficulties have been encountered in the course of the above described husking operation when most of the presently known husking machines are used. For example, these machines have caused a relatively large amount of corn to be shelled and, in addition, there was often considerable bruising of the kernels. Further, the heretofore known husking machines were usually somewhat limited in operation because of their inherent operating characteristics. In particular, some prior mechanisms necessitated harvesting the corn when its moisture content was within a rather limited range, thus greatly restricting the operation of the mechanisms. If the corn was too dry, excessive shelling resulted during harvesting. On the other hand, if the moisture content of the corn was too high, most of these mechanisms excessively damaged and bruised the kernels causing the corn to rot and mold.

In addition to the above described difficulties which arose through the use of most of the presently known husking mechanisms, troublesome difficulty was encountered when an undeveloped ear or foreign object was deposited on the husking bed. This difficulty was caused, in a large part, by the unsuitability or inadequacy of the means for accomplishing lateral yielding of the husking rolls in the prior art devices. The husking mechanism which is the subject of copending application Serial No. 72,852, of Henry E. Beck, John C. Jozwik, and Willard J. Innes which was filed on January 26, 1949, and which is assigned to the assignee of this invention, remedies most, if not all, of the inadequacies of the prior art devices. However, under certain operating conditions it is desirable to provide a roll which is capable of yielding a large amount in a localized area in response to pressures which are concentrated in that area, and yet at the same time which will present a surface of the proper resiliency to effect optimum husking actions.

Therefore, the principal object of the present invention is the provision of an improved husking mechanism embodying the desirable properties set forth above, which is adapted for use in apparatus of the class described. As will hereinafter appear, this object is accomplished through the provision of an improved husking roll which is capable of yielding inwardly a substantial amount in a single, localized area to pass foreign objects through the nip formed by cooperating roll pairs. This improved roll may be used in combination with similar or other rolls to obtain highly improved husking operation. Other objects and advantages of this invention will become apparent by reference to the accompanying drawings and the following description of certain preferred embodiments thereof.

In the drawings:

Fig. 1 is a perspective view of a typical husking unit having a roll bed which comprises husking rolls in accordance with the invention;

Fig. 2 is a diagrammatic side elevational view of the husking unit shown in Fig. 1;

Fig. 3 is a fragmentary plan view of one pair of the cooperating rolls shown in Fig. 1;

Fig. 4 is a sectional view taken on line 4—4 in Fig. 3; and

Figs. 5 and 6 are fragmentary plan views showing a fluted roll, in accordance with the invention, in combination with a plain and a fluted roll respectively.

The husking rolls of this invention may be incorporated in any of the various types of husking mechanisms which include cooperating pairs of rolls for accomplishing the stripping action in the corn husking operation. While the husking mechanism may constitute a part of a corn harvesting apparatus, it may be a separate, stationary unit. For purposes of description, the illustrated unit, designated as 7 in the drawings, is of a type which is particularly adapted for use with a tractor supported corn harvester.

The husking unit 7 comprises a suitable frame structure 9 which is adapted to support various operative elements of unit 7 and which is fabricated from suitable angle, channel, and plate sections. The operative elements include a plurality of cooperating rolls which define a husking bed 11 and a slat type conveyor mechanism 13 which is resiliently supported in an overlying relation with respect to the bed 11. Another slat type conveyor mechanism 15 is disposed below the husking bed 11 to remove the corn husks and other foreign materials which pass through the bed 11 during the husking operation. The conveyor mechanism 15 is further adapted to separate corn kernels from the husks and other foreign materials that pass between the rolls during operation. The husking unit 7 also includes a co-acting sprocket gear and drive chain mechanism, indicated generally at 18, for actuating the various moving parts. A disposal means which may be a belt type conveyor assembly 17 as shown in the drawings, is provided rearwardly of the husking bed 11. During husking operations the assembly 17 removes the stripped ears of corn from the husking unit 7 to suitable means for transporting the ears to a storage crib or the like.

A pair of spaced-apart side members 19 generally define a passageway which is adapted to receive the picked ears of corn, and these side members 19 are suitably fastened to and supported upon the main frame structure 9. The husking bed 11 forms a base or bottom for this passageway and includes rolls 21, 23, 25 and 27 which comprise two cooperating pairs. Specifically, roll 21 is positioned to cooperate with roll 23 and roll 25 cooperatively acts with roll 27. The rolls 21, 23, 25 and 27 are arranged so that their longitudinal axes lie in a generally parallel relation, and so that alternate rolls are vertically offset with respect to the adjacent rolls as shown in Fig. 1.

During normal operation, the rolls 21, 23, 25 and 27 are disposed in a manner such that the longitudinal axes thereof are inclined downwardly from the corn inlet at the forward end of the unit (Fig. 2), and this arrangement of the rolls 21, 23, 25 and 27 aids in causing the corn deposited on the husking bed 11 to move rearwardly in the husking unit 7. Each of the husking rolls 21, 23, 25 and 27 includes a central supporting shaft 29 which projects from the opposite ends of the associated roll. The projecting ends of the shafts 29 are journalled in suitable bearings (not shown) which are attached to the main frame structure 9.

Simultaneous rotation of the cooperating husking rolls 21, 23, 25 and 27 is accomplished by provision of four spur gears 31 which are fixedly attached to portions of the roll supporting shafts 29 which extend forwardly of a forward frame member 32. The spur gears 31 mesh with one another, as is particularly shown in Fig. 1, whereby the rotation of each roll is reversed and is translated to the adjacent roll.

A bevel gear 33 is keyed to the shaft 29 associated with roll 23, forwardly of the spur gear 31, as is shown in Fig. 1. The bevel gear 33 is adapted to register with and to be driven by another bevel gear 35 which is fixedly attached to a transversely extending shaft 37. This shaft 37 is journalled in suitable bearings attached to the main frame structure 9. A sprocket 39 is keyed to the shaft 37 outward of the main frame structure 9 (Fig. 1) and is adapted to be rotated by a suitable drive chain 41 which may be connected to the main driving means for the harvesting apparatus.

The conveyor mechanism 13 which is disposed in an overlying relation with respect to the husking bed 11 (Fig. 2) comprises an endless cross slat type conveyor 43 which travels generally longitudinally of the husking unit 7. As pointed out hereinbefore, the mechanism 13 is resiliently supported upon the main frame structure 9. The conveyor mechanism 13 includes a frame structure 47, the forward portion of which is resiliently supported on the main frame 9 by means of a pair of compression spring supports or counterbalances 49 (Fig. 2). The rearward portion of the structure 47 is rotatively supported on a transversely extending shaft 51 which also supports a pair of driving sprockets 53 adapted to provide power for the conveyor 43. A pair of relatively large sprockets 55 are rotatively supported adjacent the forward end of the frame structure 47 to engage and to support the cross-slat conveyor 43.

The cross-slat conveyor 43 is suitably tensioned by means of two pairs of sprockets, designated as 63 and 65 in the drawings, which are resiliently supported for rockable movement intermediate the large sprockets 55 and driving sprockets 53. Each pair of tensioning sprockets is supported, one above the other, on the rearward portion of a pair of horizontally spaced, longitudinally extending, triangularly shaped plates 67 which are rockably mounted on and resiliently supported by the compression spring supports 49. The compression spring supports 49 are pivotally attached to the forward portion of the support plates 67. The rearward portion of the plates 67 are supported by means of the tensioning sprockets 63 and 65 riding on the cross-slat conveyor 43.

The shaft 51 which is adapted to support the driving sprocket 53 of the conveyor mechanism 13 is rotated by a sprocket 69 which is keyed thereto. This sprocket 69 is attached to an end of the supporting shaft 51 (Fig. 2) and is adapted to be connected to the main driving means 18 of the husking unit 7. By means of the above described arrangement of parts, the conveyor mechanism 13 is adapted to effectively press the picked ears of corn into engagement with the cooperating husking rolls 21 and 23, and 25 and 27.

The conveyor mechanism 15 which is disposed below the husking bed 11 and which is adapted to separate any shelled corn from the husks and other foreign material falling through the bed during operation, comprises an endless cross-slat conveyor 71 which is supported, during normal operations, generally horizontally on a pair of idler sprockets 73 and a pair of driving sprockets 75 and a perforated plate or pan 77. The driving sprockets 75 are spaced rearwardly from the idler sprockets (Fig. 2). The cross-slat conveyor 71 is of a well known type and includes a pair of spaced longitudinally extending chains having a plurality of relatively widely spaced, transversely extending slats 79 attached thereto.

The idler sprockets 73 are supported on a transversely extending shaft 81 which is journalled in suitable bearings attached to the main frame structure 9. The perforated plate 77 is disposed rearwardly of shaft 81 and is attached to the main frame structure 9. The plate 77 is positioned below the upper run of the conveyor 71 and intermediate the idler and driving sprockets 73 and 75 of the conveyor mechanism 15. During operation, separated kernels of corn pass through the perforations in the pan 77 and fall downwardly whereupon they are engaged by the rearwardly moving, lower run of the conveyor belt 74. This run moves the kernels to a suitable disposal means (not shown).

The pair of driving sprockets 75 are keyed to a transversely extending shaft 85 which is also journalled in suitable bearings attached to the main frame structure 9. This shaft 85 supports the sprockets 87 and 89, one 87 of which is adapted to engage the main driving means 19 and the other 89 of which is operatively connected to the sprocket 69 which is operable to drive the resiliently supported slat conveyor mechanism 13. This operative connection is accomplished by means of a chain 91 which translates the power from the main driving means 19 of the husking unit 7 to the upper cross-slat conveyor 43.

The particular disposal means illustrated, comprises the belt-type conveyor assembly 17, which is operable to convey the stripped ears of corn from the husking unit 7. The conveyor assembly 17 is positioned rearwardly of the unit 7 to receive the husked ears as they drop from the roll bed 11. The conveyor assembly 17 is of a well known type and includes an endless belt conveyor 93 which is adapted to travel upwardly and rearwardly from a pair of driving sprockets 95. These sprockets are fixedly attached to a transversely extending shaft 97 which is rotated by means of another sprocket 99 which registers with the main driving means 19.

The main driving means 19 includes a source of power (not shown), a pair of sprockets 39 and 101 which are keyed to the transversely extending shaft 37 disposed forwardly of the husking bed 11, an endless driving chain 103, and the connecting power chain 41. The power chain 41 connects the power means (not shown) of the harvester to the sprocket 39 thereby rotating the shaft 37 and causing the husking rolls 21, 23, 25 and 27 to rotate. The other sprocket 101, as pointed out before, is keyed to the same shaft 37 and is adapted to register with the main driving chain 103. This chain travels rearwardly from the sprocket 101 to an idler sprocket 107 which is supported and journalled in a suitable bearing provided on the main frame structure 9. The driving chain 103 then passes around the sprocket 99 which is adapted to provide power for the disposal conveyor assembly 17, returns forwardly, and engages the sprocket 87 which is adapted to drive the slat conveyors 13 and 15. Through this arrangement of the main driving means 19, all of the operative elements of the husking unit 7 are driven concurrently at correlated speeds.

As previously noted, the present invention is particularly concerned with the construction of husking rolls used in husking mechanisms of the class described. These rolls may be of varying lengths and diameters, but for optimum husking efficiency the roll diameter will be in the range of from about two to four inches. Such proportioning of the husking rolls provides efficient husking and minimizes damage to the ears being husked.

It has been the practice heretofore to employ cooperating rolls made of steel or similar rigid material having indentations of various designs formed therein. In contrast to this arrangement, the present invention contemplates the use, in each of the cooperating roll pairs, of at least one resilient roll having flutes formed in the surface thereof. A particularly desirable resilient husking roll is achieved through provision of a helical flute on its outer surface, as shown in Figs. 1, 2 and 3.

The helically fluted resilient rolls 23 and 27, illustrated in the drawing, can be used with various types of cooperating rolls. However, the preferred combination is shown in Figs. 1 and 3 wherein the helically fluted resilient rolls 23 and 27 are used in combination with rigid rolls 21 and 25. These rigid rolls 21 and 25 have a plurality of spaced-apart longitudinally extending flutes 109 therein. Additional combinations are shown in Figs. 5 and 6 wherein the helically fluted resilient roll 23 is shown paired with a resilient or rigid roll 111 having a smooth cylindrical surface (Fig. 5), or with another spirally fluted roll 113 which likewise may be of resilient or rigid material (Fig. 6).

For efficient husking operation it is necessary that the resilient husking rolls 23 and 27 yield a sufficient amount in a localized area to allow passage of trash, foreign material and the like, between the cooperating rolls without, at the same time, interrupting the operative engagement of the pair of rolls. This localized lateral yielding is accomplished, in part, in the improved husking mechanism by covering the shafts 29 of rolls 23 and 27 with a layer 115 of resilient material having a hardness in the range from about 60-A durometer after 10 seconds to 95-A durometer after 10 seconds. The shafts 29 may be of any desired shape, but particularly effective husking is obtained when the shaft 29 is multi-sided, as for example, the square shaft shown at 29a in Figure 4.

The type A durometer used to measure the hardness of the rubber comprising the resilient rolls is an instrument that is recognized by the American Society of Testing Materials and the rubber industry generally. It has been recommended by the A. S. T. M. for the determination of the hardness of rubber and like material. However, this recommendation is tentative and has been given number D-676. The "tentative" designation by the A. S. T. M. merely indicates that the procedure for operation of the instrument is not definitely settled. Consequently, the description of the procedure adopted for the measurements used herein will be set forth.

In the present determinations, a type A durometer has been used with a load of 2 pounds for all measurements. This load is translated to an inverted frusto-conical impresser point which presses into the surface to be tested varying distances depending upon the hardness thereof. For the present tests, the impresser point had a diameter of .031 inch and flared outwardly to a diameter of .052 inch. The sides of the frusto-conical impresser point converge at an angle of 35°. The impresser point was allowed 10 seconds to penetrate into the rubber surfaces tested. The extent of this penetration was measured by a standard meter used with durometers, and the reading taken from this meter indicated the hardness of the resilient material.

In the preferred embodiment illustrated in the drawings, the resilient rolls 23 and 27 are provided with a pair of continuous, spaced-apart, generally helical flutes 117 which are formed in the roll surfaces. While flutes or indentations of other configurations and a different number of flutes may be used, tests have indicated that a roll having a surface with a pair of helical flutes provided therein is particularly successful in providing efficient stripping action in husking mechanisms of the class described.

In addition to the yielding accomplished through the provision of resilient layers 115 further yielding of the roll surface is made possible by fabricating the resilient layer 115 in a manner so as to provide hollow spaces or passageways intermediate the layer 115 and the supporting shaft 29. In the preferred roll construction, as illustrated in the drawings, the hollowed-out spaces constitute a pair of generally channel-shaped, hollowed out passageways 119 which extend helically around the inner surface of the resilient layer 115. This construction of the inner surface of the layer 115 provides lands or ribs 120 intermediate the passageways 119. In order to bind the resilient layer 115 to the supporting shaft 29, the ribs 120 are vulcanized or otherwise fixedly attached to the shaft 29. The ribs 120 are disposed radially inwardly of the flutes 117 formed on the outer surface of the roll, as shown in Figs. 3 and 4. The particular roll construction which has been described is operable to permit localized inward yielding of the roll surface and at the same time to maintain the remainder of the roll surface in operative engagement with the cooperating roll.

The pitch, depth and width of the flutes 117 which are formed in the surface of rolls 23 and 27 may vary between wide limits, depending upon the particular embodiments of the roll. However, the depth of the passageway 119 should bear a ratio to the thickness of the resilient layer 115 in the range from about 1 to 3 to 1, and the width of the land or rib 120 should bear a ratio to the width of the flute 117 of from about 1 to 4 to 1, the flute 117 being disposed centrally of the land 120 as illustrated.

During the operation of the husking apparatus 7, illustrated in Figs. 1 and 2, the ears of corn, picked during the corn harvesting process, are dropped on the bed 11 of rapidly turning, cooperatively acting, husking rolls 21, 23, 25 and 27. The husks are engaged or grasped in the nips which are provided along the line of tangential contact between the cooperating rolls 21 and 23 and rolls 25 and 27. The resiliently supported slat conveyor 13, which is disposed in an overlying relation with respect to bed 11, is adapted to cooperatively act with this bed 11 to aid in causing the ears of corn to engage the aforementioned nips.

Due to the fact that rolls 23 and 25 are fabricated from resilient material, so as to provide roll surfaces having a relatively high coefficient of friction, more efficient engagement of the husks is made possible. In addition, it is apparent that the resilient construction of rolls 23 and 27 tends to decrease shelling and bruising of the corn during the husking operation.

Once the husks have become engaged between a pair of cooperating roll surfaces, the counter-rotation of the rolls 21, 23, 25 and 27 causes the husks to be stripped from the ears. The bared ears then pass down the husking bed 11 to the disposal means 17. At the same time, the husks are deposited on the slat type conveyor 15 which is disposed below the husking bed 11. As pointed out before, the conveyor mechanism 15 separates any loose corn from the husks and passes the husks to suitable disposal means (not shown).

In the event that a foreign object or undeveloped ear enters the nips which exist between a pair of cooperating rolls 21 and 23 or 25 and 27, the surface of the roll yields inwardly in the localized area adjacent that object and, as a result, yielding and separation at the roll surfaces caused by a foreign object passing between rolls 21 and 23 or rolls 25 and 27 will closely approximate the length of that object. This feature allows the remainder of the nip between the cooperating rolls to continue in normal operation, resulting in a considerable increase in the efficiency of the husking operation.

From the foregoing description and discussion, it is readily observed that the helically fluted resilient husking roll of the invention makes possible a great improvement in husking operation, and when used with a similar roll or other roll used in the art, a greatly improved stripping action results. In addition, the above described husking apparatus uses a minimum number of parts and permits husking of the corn with minimum shelling of the kernels and damage to the ears.

Various features of my invention which are believed to be new are set forth in the appended claims.

I claim:

1. A husking roll adapted for use with the apparatus of the class described, said husking roll including a supporting shaft, and a generally tubular shaped layer of resilient material which is disposed about said shaft, said resilient material having a hardness in the range from about 60-A durometer after 10 seconds to 95-A durometer after 10 seconds, said resilient layer having a pair of continuous, spaced flutes helically circumscribing the outer surface thereof, said flutes having a generally semi-circular cross section, the inner surface of said layer having a pair of ribs formed thereon, said ribs being disposed radially inwardly of said helical flutes throughout the length of said roll, said ribs being attached to said shaft thereby providing hollow passageways intermediate said resilient layer and said shaft.

2. A husking roll adapted for use in apparatus of the class described, said husking roll including a supporting shaft and a layer of resilient material disposed about and fixedly attached to said shaft, the outer surface of said resilient layer being provided with a pair of continuous, spaced apart, generally helically extending flutes, said flutes having a generally semi-circular cross section, said resilient layer having a hardness in the range of from about 60-A durometer after 10 seconds to 95-A durometer after 10 seconds, the inner surface of said resilient layer having a pair of continuous, spaced apart, generally helically extending ribs thereon, said ribs being disposed radially inwardly of said flutes, said ribs being attached to said supporting shaft thereby forming hollow passageways intermediate said resilient layer and said shaft, said resilient layer having a thickness which bears a ratio to the depth of said passageway in the range of from about 1 to 3 to 1, said passageways having a width which bears a ratio to the width of said flutes in the range of from about 1 to 4 to 1.

3. A husking roll adapted for use with apparatus of the class described, said husking roll including a supporting shaft, and a generally tubular shaped layer of resilient material which is disposed about said shaft, said resilient material having a flute helically circumscribing the outer surface thereof, the inner surface of said layer having a rib formed thereon, said rib being disposed radially inwardly of said helical flute throughout a substantial portion of the length of said roll, said rib being attached to said shaft thereby providing a space intermediate said resilient layer and said shaft.

4. A husking roll adapted for use with apparatus of the class described, said husking roll including a supporting shaft, and a generally tubular shaped layer of resilient material which is disposed about said shaft, the outer surface of said resilient material having thereon means for advancing crop materials longitudinally therealong, said resilient material having a generally helical rib formed on the inner surface thereof which rib abuts said shaft and extends along a substantial portion of the length of said roll, thereby providing space intermediate said resilient material and said shaft.

5. A husking roll adapted for use with apparatus of the class described, said husking roll including a supporting shaft and a generally tubular shaped layer of resilient material which is disposed about said shaft, the outer surface of said resilient material having a helical continuous flute formed therein which extends along a substantial portion of the length of said roll, said resilient material having a generally helical rib formed on the inner surface thereof which abuts said shaft and which extends along a substantial portion of the length of said roll, thereby providing space intermediate said resilient layer and said shaft, said flute in said resilient material and said rib formed on the inner surface of said resilient material having substantially the same pitch.

JOHN C. JOZWIK.

REFERENCES CITED

The following references are of record in the file of this patent:

UNITED STATES PATENTS

| Number | Name | Date |
| --- | --- | --- |
| 227,886 | Eaton | May 25, 1880 |
| 1,682,143 | Paradise | Aug. 28, 1928 |
| 1,736,347 | Keeler | Nov. 19, 1929 |
| 1,867,955 | Ryder | July 19, 1932 |
| 2,308,102 | Paradise | Jan. 12, 1943 |
| 2,391,846 | Scranton | Dec. 25, 1945 |
| 2,413,279 | Aasland | Dec. 31, 1946 |
| 2,469,687 | Fergason | May 10, 1949 |